United States Patent
Song (10) Patent No.: US 11,448,770 B2
(45) Date of Patent: Sep. 20, 2022

(54) METHODS AND SYSTEMS FOR DETECTING SIGNAL SPOOFING

(71) Applicant: Faraday&Future Inc., Gardena, CA (US)

(72) Inventor: Xiufeng Song, San Jose, CA (US)

(73) Assignee: Faraday&Future Inc., Gardena, CA (US)

( * ) Notice: Subject to any disclaimer, the term of this patent is extended or adjusted under 35 U.S.C. 154(b) by 0 days.

(21) Appl. No.: 15/941,640

(22) Filed: Mar. 30, 2018

(65) Prior Publication Data

US 2019/0243002 A1 Aug. 8, 2019

Related U.S. Application Data

(60) Provisional application No. 62/479,383, filed on Mar. 31, 2017.

(51) Int. Cl.
*G01S 19/20* (2010.01)
*B60Q 9/00* (2006.01)
*G01S 19/21* (2010.01)

(52) U.S. Cl.
CPC .............. *G01S 19/20* (2013.01); *B60Q 9/00* (2013.01); *G01S 19/215* (2013.01)

(58) Field of Classification Search
CPC ............ G01S 19/20; G01S 19/21; B60Q 9/00
USPC ....................................................... 701/468
See application file for complete search history.

(56) References Cited

U.S. PATENT DOCUMENTS

| | | | | |
|---|---|---|---|---|
| 6,496,778 B1* | 12/2002 | Lin | ......................... | G01S 19/55 |
| | | | | 701/470 |
| 6,879,875 B1* | 4/2005 | Hu | ....................... | G01C 21/165 |
| | | | | 318/568.1 |
| 9,273,968 B2* | 3/2016 | Oohashi | ................. | G01C 21/30 |
| 9,341,718 B2* | 5/2016 | Vanderwerf | ............ | G01S 19/20 |
| 2003/0135327 A1* | 7/2003 | Levine | ................. | G01C 21/165 |
| | | | | 701/500 |
| 2005/0114023 A1* | 5/2005 | Williamson | ......... | G01C 21/165 |
| | | | | 701/472 |
| 2005/0125141 A1* | 6/2005 | Bye | ....................... | G01C 21/165 |
| | | | | 701/469 |
| 2005/0203701 A1* | 9/2005 | Scherzinger | ........... | G01C 15/00 |
| | | | | 701/470 |
| 2011/0231061 A1* | 9/2011 | Reeve | .................. | A01B 69/008 |
| | | | | 701/41 |

* cited by examiner

*Primary Examiner* — Tan Q Nguyen
(74) *Attorney, Agent, or Firm* — Veros Legal Solutions, LLC (57) ABSTRACT

A method and system for detecting signal spoofing are disclosed. According to certain embodiments, the spoofing detection method may include receiving one or more position signals indicative of a first position of a vehicle at a first time. The method may also include receiving one or more reference signals indicative of a second position of the vehicle at the first time. The method may also include determining a difference between the first position and the second position. The method may also include determining that the difference is above a predetermined tolerance. The method may further include notifying the vehicle positioning system.

16 Claims, 7 Drawing Sheets

METHODS AND SYSTEMS FOR DETECTING SIGNAL SPOOFING

CROSS-REFERENCE TO RELATED APPLICATIONS

This application claims the priority benefit of U.S. Provisional Application No. 62/479,383, filed Mar. 31, 2017, the entirety of which is hereby incorporated by reference.

TECHNICAL FIELD

The present disclosure relates generally to a method and system for detecting signal spoofing, and more particularly, to a method and system for detecting whether position signals received by a vehicle are spoofed based on discrepancy between the position signals and various reference signals.

BACKGROUND

The navigation and/or tracking of a vehicle have never been easier due to various sophisticate positioning systems and/or sensors. In particular, autonomously and semi-autonomously controlled vehicles are capable of operating with little or no human input by relying on various positioning signals indicative of the position and/or surrounding environment of the vehicles. For example, a vehicle may use Global Positioning System (GPS) data, light detection and ranging (LIDAR) data, sound navigation and ranging (SONAR) data, and other similar sensor data for safely and efficiently navigating through traffic, avoiding collisions, maneuvering along different kinds of terrain, finding the route to a destination, etc. Based on the sensor data, the vehicle can make continuous adjustments to its operation. As such, precise and safe completion of the vehicle operations is dependent on the accuracy and reliability of the positioning signals.

The positioning signals, when received from external sources (e.g., GPS signals received from satellite constellation) or depending from environment outside the vehicle (e.g., LIDAR signals echoed from objects surrounding the vehicle), are prone to jamming and/or spoofing. For example, the weak GPS signals are an easy target for jamming. Illegal jamming devices can transmit noises at radio frequency to interfere with the GPS receivers' ability to lock onto the GPS signal, and thus lead to denial of GPS service to the vehicle.

Signal spoofing is worse than jamming as spoofers can construct and broadcast fake navigation signals that will deceive the positioning sensors to provide false readings and subject the vehicle (or its human operator) to dangerous situations. For example, a vehicle may reply on longitude and altitude, as well as accurate time information provided by the GPS. GPS spoofing involves fabricating GPS signals, aiming at giving the vehicle a false sense of accurate physical location and causing the vehicle to divert from the correct route. As another example, the LIDAR system of a self-driving vehicle may be overwhelmed by echoes of fake obstacles (e.g., a phantom pedestrian or phantom wall) or simply be flooded with spurious signals, such that the self-driving vehicle would slow down or not move at all, to avoid the fake obstacles.

Malicious spoofing attacks may be used to hijack/steal a vehicle, cause an accident, or cause other disastrous effects to properties and even human lives. However, the absence of effective anti-spoofing technology makes the current vehicle positioning systems vulnerable to spoofing attacks. For example, most of the civilian vehicles can only use the civilian GPS which is lack of authentication or encryption measures for preventing or detecting spoofing.

The disclosed spoofing detection method and system are directed to mitigating or overcoming one or more of the problems set forth above and/or other problems in the prior art.

SUMMARY

One aspect of the present disclosure is directed to a spoofing detection method for a vehicle positioning system. The spoofing detection method may include receiving one or more position signals indicative of a first position of a vehicle at a first time. The method may also include receiving one or more reference signals indicative of a second position of the vehicle at the first time. The method may also include determining a difference between the first position and the second position. The method may also include determining that the difference is above a predetermined tolerance. The method may further include notifying the vehicle positioning system.

Another aspect of the present disclosure is directed to a spoofing detection method for a vehicle positioning system. The method may include receiving one or more position signals indicative of a first position of a vehicle at a first time. The method may also include receiving one or more reference signals indicative of a second position of the vehicle at the first time. The method may also include determining, based on the one or more reference signals, a probability score indicative of a likelihood that the first position is an actual position of the vehicle at the first time. The method may also include determining that the probability score is below a threshold score. The method may further include notifying the vehicle positioning system.

Yet another aspect of the present disclosure is directed to a vehicle positioning system. The system may include a plurality of sensors configured to generate one or more position signals indicative of a first position of a vehicle at a first time, and one or more reference signals indicative of a second position of the vehicle at the first time. The system may also include a controller in communication with the plurality of sensors. The controller may be configured to: determine a difference between the first and second positions; determine that the difference is above a predetermined tolerance; and generate an alert that the one or more position signals are spoofed.

DETAILED DESCRIPTION

This disclosure is generally directed to a method and system for detecting whether position signals indicative of the position of a vehicle are spoofed. For illustrative purpose only, the principles of the present disclosure are described in connection with a terrestrial vehicle. Nevertheless, those skilled in the art will recognize that the principles of the present disclosure may be applied in any types of device or machine that rely on certain position signals for determining the actual positions of the devices or machines. For example, these devices or machines include but are not limited to marine vessels, aircrafts, unmanned vehicles (e.g., drones), robots, mobile phones, portable electronics, wearable devices (e.g., watch, wristband, etc.), or the like.

Figure 1:
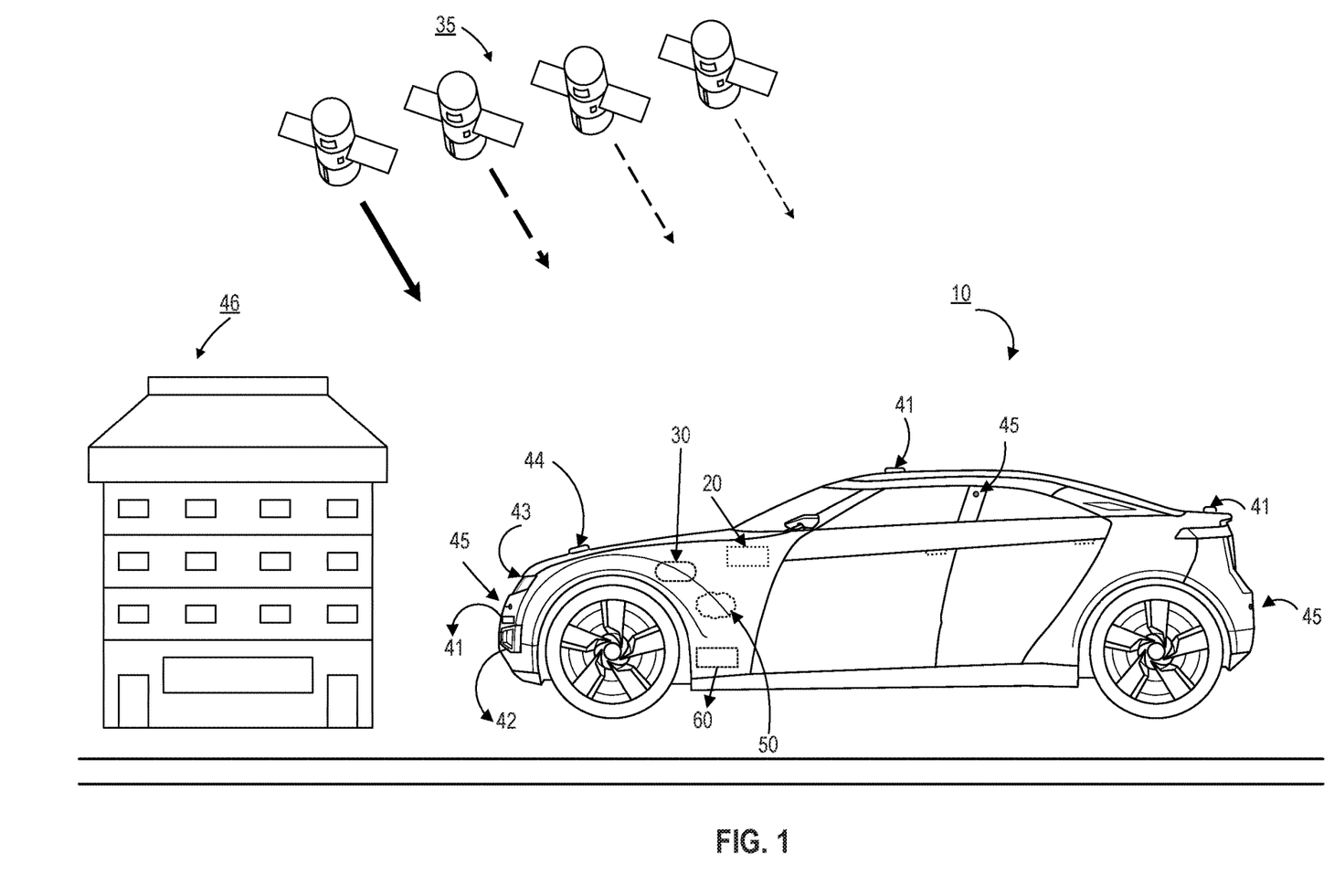
FIG. 1 is a schematic diagram illustrating a vehicle, according to an exemplary embodiment.

FIG. 1 is a schematic diagram illustrating an exemplary vehicle 10 in which the disclosed spoofing detection method and system may be implemented. Vehicle 10 may be an electric vehicle, a fuel cell vehicle, a hybrid vehicle, or a conventional internal combustion engine vehicle. Vehicle 10 may have any body style, such as a sports car, a coupe, a sedan, a pick-up truck, a station wagon, a sports utility vehicle (SUV), a minivan, or a conversion van. Vehicle 10 may be configured to be operated by an operator occupying the vehicle, remotely controlled, and/or autonomous.

With continued reference to FIG. 1, vehicle 10 may include a plurality of positioning sensors in communication with a controller 20. The positioning sensors may include any number and/or combination of devices known in the art for generating signals indicative of position information of vehicle 10. The position information includes but is not limited to position, orientation, acceleration, velocity, heading, angular rate, and/or other parameters of vehicle 10. For example, the positioning sensors may include one or more of a global navigation satellite system (GNSS) receiver 30 (for example, a GPS receiver), a perception sensor 40, an inertial measurement unit (IMU) 50, an odometer 55, etc.

GNSS receiver 30 may be configured to receive radio signals from a satellite constellation 35 along lines of sight. In some embodiments, GNSS receiver 30 may be further configured to compute the position of GNSS receiver 30 (and thus the position of vehicle 10 to which GNSS receiver 30 is affixed) based on the received satellite signals. Alternatively, GNSS receiver 30 may convey the received satellite signals to controller 20 for computation of the position of vehicle 10. As known in the related art, a GNSS is a system of satellites that provides autonomous geo-spatial positioning with global coverage. Currently, the United States GPS and the Russian GLONASS are the only GNSSs that support global coverage. Other prospective GNSSs are China's BeiDou and Europe Union's Galileo. GNSS receiver 30 may be configured to receive satellite signals from at least one of these four GNSSs.

Perception sensor 40 may include any device that is configured to provide scene data describing an environment 46 in the vicinity of vehicle 10. Environment 46 may be surrounding objects such as buildings, other vehicles, pedestrians, etc. Exemplarily, perception sensor 40 may embody a device that detects and ranges objects located 360 degrees around vehicle 10. For example, perception sensor 40 may be embodied by a LIDAR device 41, a radio detection and ranging (RADAR) device 42, a SONAR device 43, an ultrasonic transducer 44, a camera 45, or any other device known in the art. In one example, perception sensor 40 may include an emitter that emits a detection beam, and an associated receiver that receives a reflection of that detection beam. Based on characteristics of the reflected beam, a distance and a direction from an actual sensing location of perception sensor 40 on vehicle 10 to a portion of a sensed physical object may be determined. By utilizing beams in a plurality of directions, perception sensor 40 may generate a picture of the surroundings of vehicle 10. For example, if perception sensor 40 is embodied by LIDAR device 41 or another device using multiple laser beams, perception sensor 40 may generate a cloud of points as the scene data describing an environment in the vicinity of vehicle 10.

IMU 50 may include one or more devices that provide measurements of angular position, rates, and/or acceleration of vehicle 10. For example, IMU 50 may include a 6-degree of freedom (6 DOF) IMU, which consists of a 3-axis accelerometer, 3-axis angular rate gyros, and sometimes a 2-axis inclinometer. The 3-axis accelerometer may provide signals indicative of the acceleration of vehicle 10 in the x, y, and z directions. The 3-axis angular rate gyros may provide signals indicative of the pitch rate, yaw rate, and roll rate of vehicle 10. The 2-axis inclinometer may provide, for example, the pitch angle and the roll angle. Measurements from IMU 50 may include a bias offset or a bias drift. Bias offset is a constant error offset component in the measurement. Bias drift is a dynamic error offset component in the measurement. In addition, data generated from integrating measurements from IMU 50 may include a random walk error due to noise. That is, each measurement may include some error due to noise, which is then compounded by the integration of measurements. Such error may be unbounded. In various embodiments, the bias offset, bias drift, and/or noise model of IMU 50 may be known, either by conducting device characterization measurements or by referring to the device specifications data.

Odometer 55 may provide a signal indicative of a distance traveled by vehicle 10. In one embodiment, odometer 55 may measure the number of rotations of a wheel of vehicle 10, so as to determine the distance travelled by vehicle 10. In another embodiment, odometer 55 may measure the number of rotations of a member of a drive train in vehicle 10. For example, odometer 55 may provide a measurement of the number of rotations of an axle of vehicle 10.

Figure 2:
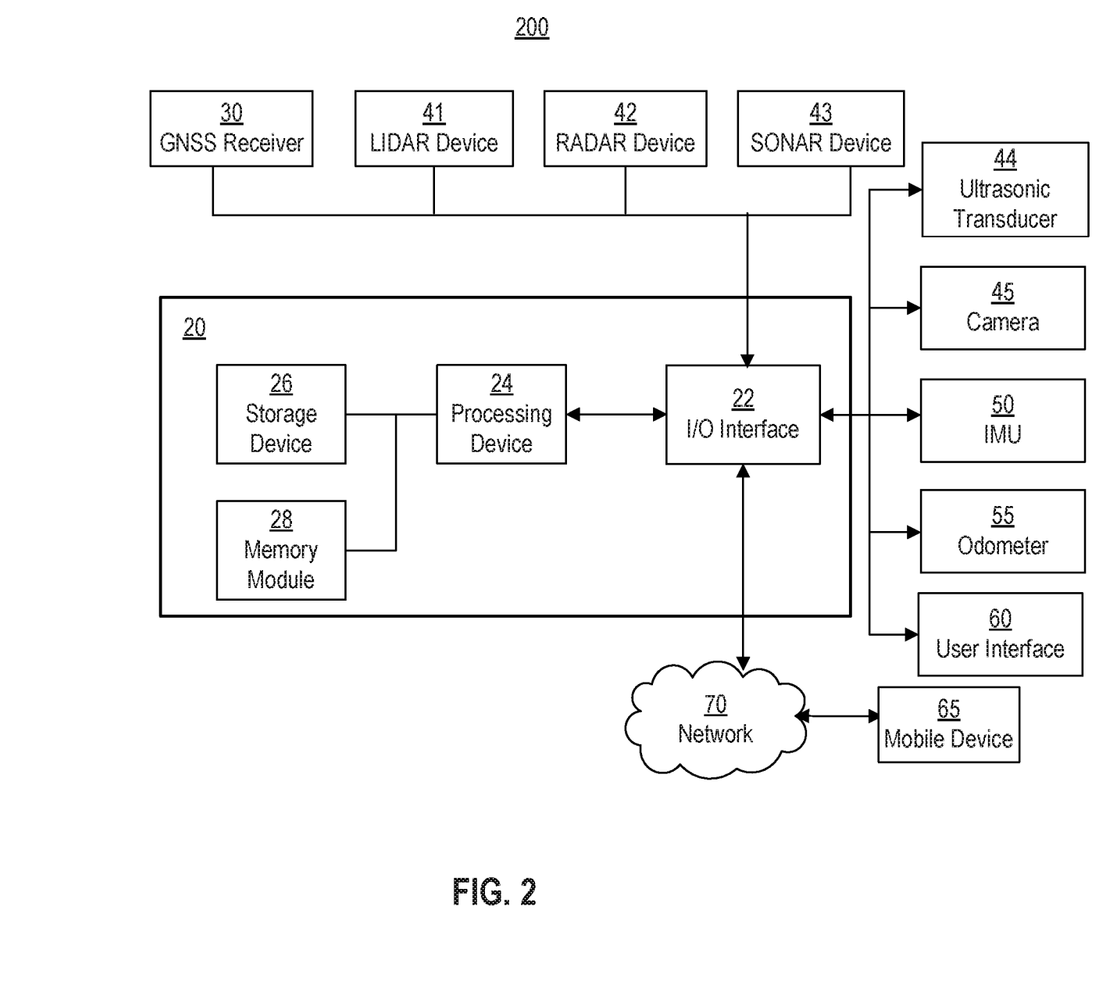
FIG. 2 is a block diagram of an exemplary vehicle positioning system for use in the vehicle shown in FIG. 1.

FIG. 2 is a block diagram of a vehicle positioning system 200 used by vehicle 10, according to an exemplary embodiment. As described in more detail below, system 200 may be configured to perform the disclosed methods to detect signal spoofing. Referring to FIG. 2, system 10 may include one or more of controller 20, GNSS receiver 30, LIDAR device 41, RADAR device 42, SONAR device 43, ultrasonic transducer 44, camera 45, IMU 50, odometer 55, a user interface 60, a mobile device 65, and a network 70.

In the disclosed embodiments, controller 20 may include, among other things, an input/output (I/O) interface 22, a processing device 24, a storage device 26, and a memory module 28. At least some of these components of controller 20 may be configured to transfer data and send or receive instructions between or among each other.

I/O interface 22 may be configured to facilitate the communication between controller 20 and other components of system 200. For example, I/O interface 22 may receive sensor data from GNSS receiver 30, LIDAR device 41, RADAR device 42, SONAR device 43, ultrasonic transducer 44, camera 45, IMU 50, odometer 55, and transmit the sensor data to processing device 24 for further processing. I/O interface 22 may also output information, e.g., an alert about a detected spoofing attack, to user interface 60.

In some embodiments, I/O interface 22 may be configured to communicate with mobile device 65 via network 70. Network 70 may be any type of wired or wireless network that may allow transmitting and receiving data. For example, network 70 may be a wired network, a local wireless network (e.g., Bluetooth™, WiFi, near field communications (NFC), etc.), a cellular network, an Internet, or the like, or a combination thereof. Other known communication methods which provide a medium for transmitting data are also contemplated.

Processing device 24 may include any appropriate type of general-purpose or special-purpose microprocessor, digital signal processor, or microcontroller. Processing device 24 may be configured as a separate processor module dedicated to detecting signal spoofing. Alternatively, processing device 24 may be configured as a shared processor module for performing other functions unrelated to detecting spoofing attacks.

Processing device 24 may be configured to receive data and/or signals, via, for example, I/O interface 22, from components of system 200 and process the data and/or signals to determine one or more conditions of vehicle 10. For example, processing device 24 may receive the sensor data and determine the position of vehicle 10. Processing device 24 may also be configured to analyze the sensor data and determine whether some or all of the sensor data is spoofed.

Processing device 24 may execute computer instructions (program codes) stored in storage device 26 and memory module 28, and may perform functions in accordance with exemplary techniques described in this disclosure. More exemplary functions of processing device 24 will be described later in relation to FIGS. 3-7.

Storage device 26 and memory module 28 may include any appropriate type of mass storage provided to store any type of information that processing device 24 may need to operate. Storage device 26 and memory module 28 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Storage device 26 and/or memory module 28 may be configured to store one or more computer programs that may be executed by processing device 24 to perform exemplary functions for detecting signal spoofing, as disclosed in this application. For example, storage device 26 and/or memory module 28 may be configured to store program(s) that may be executed by processing device 24 to compare the differences among the sensor data generated by different positioning sensors, and determine whether certain positioning sensors are spoofed based on the differences.

Storage device 26 and/or memory module 28 may be further configured to store information and data used by processing device 24. For instance, storage device 26 and/or memory module 28 may be configured to store the position data received from GNSS receiver 30 and sensor data generated by various positioning sensors for further analysis. Storage device 26 and/or memory module 28 may also store a two-dimensional or three-dimensional map of the traveling route of vehicle 10.

One or more components of controller 20 may be located in vehicle 10, as shown, or may be alternatively in a mobile device, in the cloud, or another remote location. Components of controller 20 may be in an integrated device, or distributed at different locations but communicate with each other through a network. For example, processing device 24 may be a processor on-board vehicle 10, a processor inside a mobile device, or a cloud processor, or any combinations thereof.

User interface 60 may include a knob, a dial, a keyboard, and/or a touch screen for an operator of vehicle 10 to input position of vehicle 10. User interface 60 may further include a display or a speaker to present visual and/or audio cues alerting the operator to a spoofing attack.

Mobile device 65 may be carried by the operator or a passenger (collectively referred to as "occupant") of vehicle 10. For example, mobile device 65 may be a cell phone, a smartphone, a wearable device, a remote control, a radio, and the like. Similar to user interface 60, mobile device 65 may include an input interface for the occupant of vehicle 10 to input position of vehicle 10, and further include an output interface for outputting an alert of spoofing attack. In some embodiments, mobile device 65 may include its own positioning sensors (e.g., GPS receiver, Bluetooth™ receiver, compass, accelerometer) for measuring the position of mobile device 65. When mobile device 65 is on-board vehicle 10, the position of mobile device 65 should coincide with the position of vehicle 10, and may be used to verify the accuracy of the positioning sensors of vehicle 10.

Next, spoofing detection methods consistent with the present disclosure will be described in connection with system 200. For illustrative purpose only, the disclosed methods may be described as being applied to detecting GPS spoofing, wherever proper. Nevertheless, it is appreciated by those skilled in the art that the disclosed methods are equally applicable to detecting spoofing of other types of signals, e.g., LIDAR signals, which are received from an external source or echoed back from environment 46.

Figure 3:
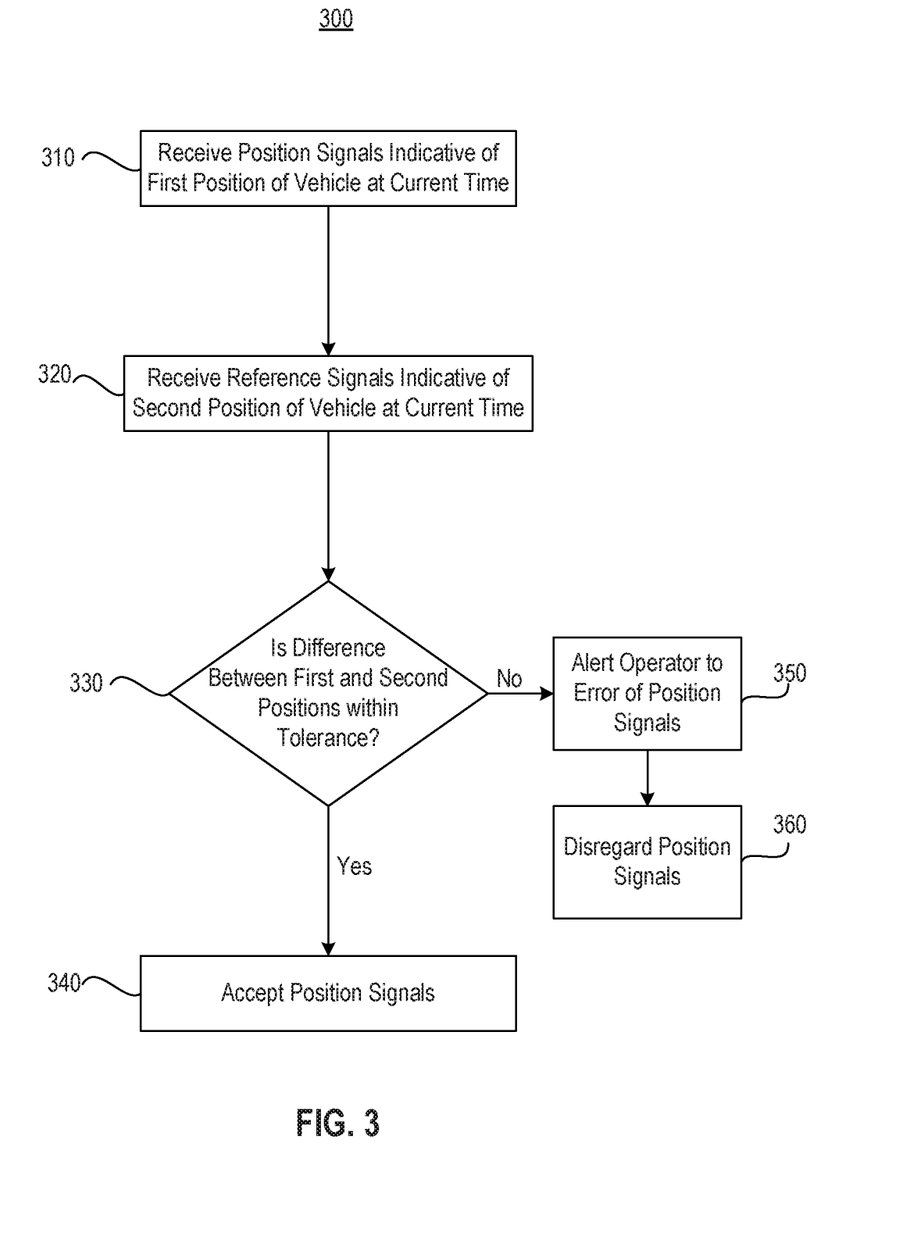
FIG. 3 is a flowchart of a first method for detecting signal spoofing, according to an exemplary embodiment.

FIG. 3 is a flowchart of an exemplary method 300 for detecting signal spoofing, according to an exemplary embodiment. Referring to FIG. 3, method 300 may start with controller 20 receiving position signals indicative of a first position of vehicle 10 at current time (step 310). The position signals may be satellite signals received via GNSS receiver 30. Controller 20 may then determine the first position based on the satellite signals. If the satellite signals are authentic, the first position should reflect the current actual position of vehicle 10. However, if the satellite signals are jammed or spoofed, the first position may be different from the actual position of vehicle 10.

To verify the authenticity of the position signals, controller 20 may receive reference signals indicative of a second position of vehicle 10 at the current time (step 320). In some embodiments, the reference signals may also be satellite signals. But the position signals and reference signals are generated by different satellite constellations. In some embodiments, the reference data may be sensor data generated by positioning sensors other than GNSS receiver 30, such as LIDAR device 41, RADAR device 42, SONAR device 43, ultrasonic transducer 44, camera 45, IMU 50, odometer 55, etc.

Controller 20 may determine whether the difference between the first and second positions is within a predetermined tolerance (step 330). If the difference is within the tolerance, controller 20 may conclude that the position signals are authentic and use the position signals to determine the actual position of vehicle 10 (step 340). Conversely, if the difference exceeds or is equal to the tolerance, controller 20 may conclude that the position signals are likely spoofed and alert an operator of vehicle 10 about the suspected spoof attack (step 350). Controller 20 may further disregard the position signals received in step 310 in determining the actual position of vehicle 10 (step 360). Controller 20 may instead use the reference signals to determine the actual position of vehicle 10, or ask the operator to take control of vehicle 10 so as not to rely on the autonomous navigation functions of vehicle 10.

As explained above, method 300 is not limited to detecting GPS spoofing. That is, the "position signals" referred to by step 310 are not limited to satellite signals. For example, in one embodiment, the GNSS data may be considered as the "position signals," while the IMU data may serve as the "reference signals" for verifying the authenticity of the satellite signals. In another embodiment, the LIDAR data may be considered as the "position signals," while the satellite signals may serve as the "reference signals."

Because the position signals and reference signals used in method 300 are from different sources (e.g., different constellations) and/or generated by different types of sensors (e.g., GNSS receiver 30 and LIDAR device 41), it is unlikely that both the position signals and the reference signals are spoofed at the same time. Accordingly, the position signals and reference signals may be used to provide mutual verification.

FIG. 2 shows vehicle positioning system 200 may include a plurality of different position sensors. As such, system 200 provides an abundance and/or redundancy of reference signals for verifying the authenticity of the position signals. Next, variations of method 300 will be described for detecting signal spoofing by using different types of reference signals.

Figure 4:
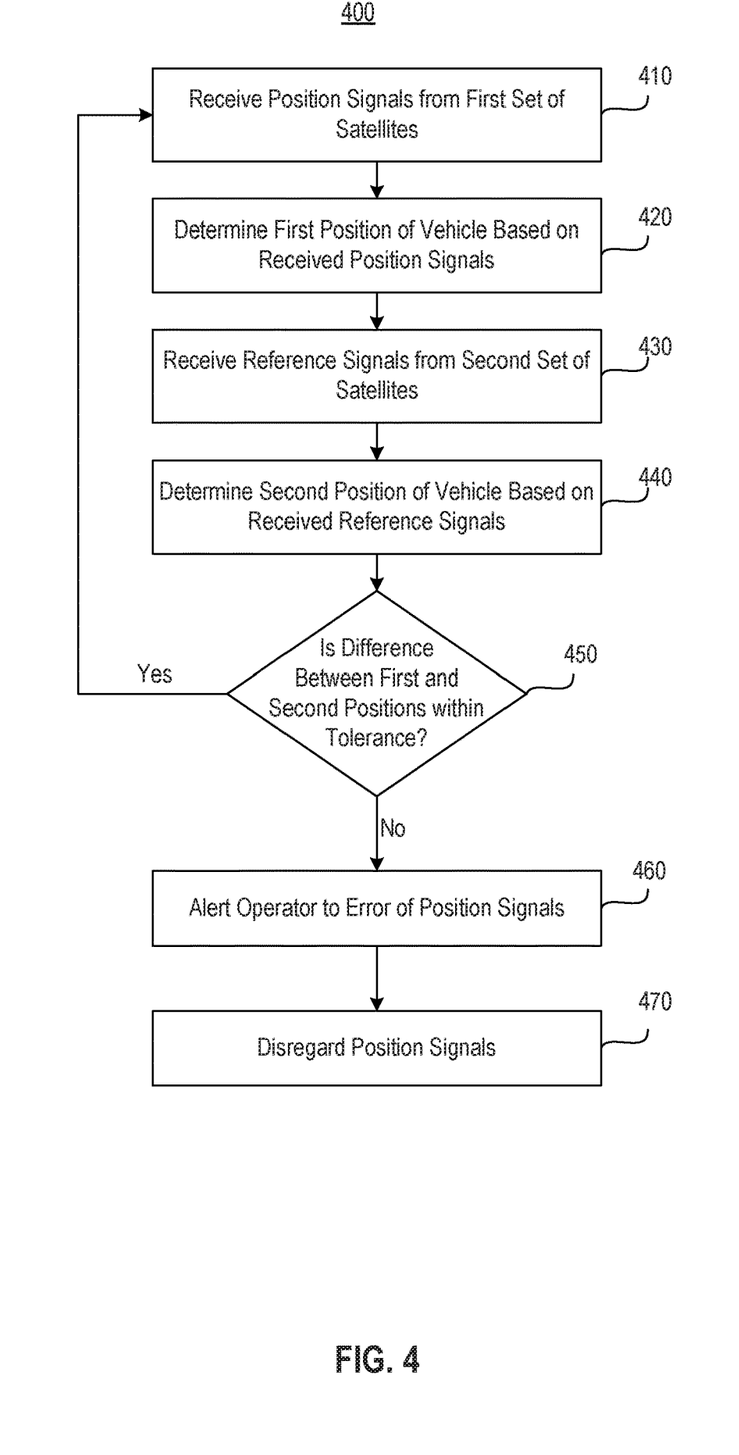
FIG. 4 is a flowchart of a second method for detecting signal spoofing, according to another exemplary embodiment.

FIG. 4 is a flowchart of an exemplary method 400 for detecting signal spoofing. As shown in FIG. 4, controller 20 may use satellite signals to determine the position of vehicle 10 and navigate vehicle 10. In step 410, controller 20 may receive, via GNSS receiver 30, position signals from a first set of satellites. For example, the first set of satellites may be a GPS satellite constellation including at least four satellites visible from vehicle 10. By default, GNSS receiver 30 tends to select satellites emitting stronger signals, i.e., receiving satellite signals whose strengths are above a predetermined strength level. In step 420, controller 20 may then determine a first position of vehicle 10 based on the received position signals.

However, the stronger satellite signals are easy to be detected and forged by spoofers. To verify the authenticity of the position signals received from the first set of satellites, controller 20 may further receive, via GNSS receiver 30, reference signals from a second set of satellites (step 430). In one embodiment, the first and second sets of satellites may belong to the same GNSS, e.g., the U.S. GPS. But the reference signals received from the second set of satellites may have a signal strength below the predetermined strength level, and thus are harder to be spoofed. In another embodiment, the first and second sets of satellites may be selected from different GNSSs. For example, the first set of satellites may belong to the GPS, while the second set of satellites may be selected from one of Russian GLONASS, China's BeiDou, or Europe Union's Galileo. Since different countries' GNSSs operate at different radio-frequency bands, GNSS receiver 30 used in the disclosed embodiments may be capable of receiving signals from different GNSSs.

By using the reference signals from a randomly selected satellite constellation (either from the same GNSS or from different GNSSs), controller 20 may reduce the chances that the reference signals are spoofed. In step 440, controller 20 may determine a second position of vehicle 10 based on the received reference signals. In step 450, controller 20 may determine whether the difference between the first and second positions is within a predetermined tolerance. If the difference is within the predetermined tolerance, controller 20 may accept the position signals from the first set of satellites as authentic and use the position signals to determine the current actual position of vehicle 10. Controller 20 may then repeat step 410 to receive the position signals at the next point in time. If the difference exceeds or is equal to the predetermined tolerance, controller 20 may alert the operator of vehicle 10 to the errors of the position signals (step 460) and/or disregard the position signals in determining the actual position of vehicle 10 (step 470).

Figure 5:
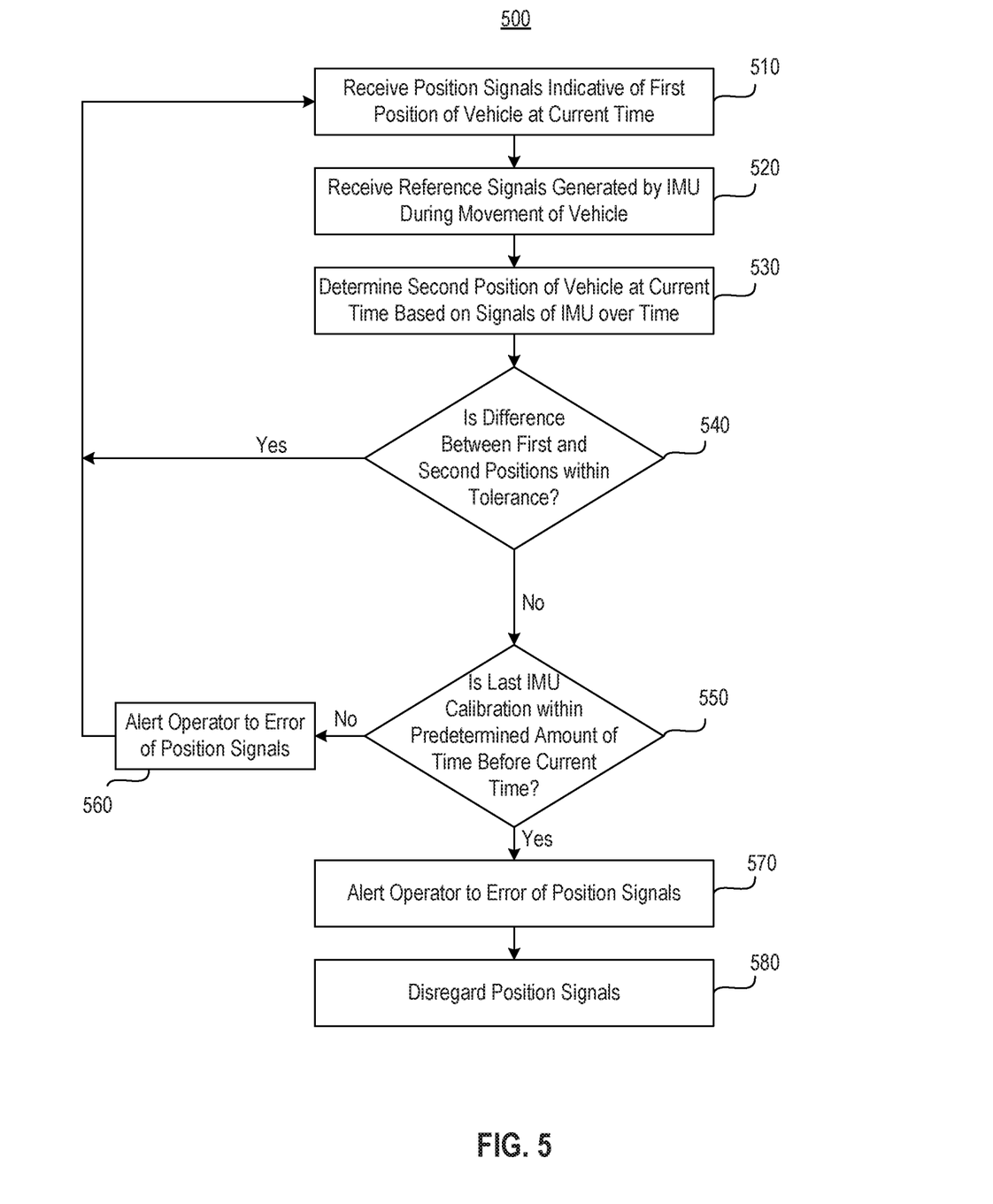
FIG. 5 is a flowchart of a third method for detecting signal spoofing, according to another exemplary embodiment.

FIG. 5 is a flowchart of a method 500 for detecting signal spoofing, according to another exemplary embodiment. Referring to FIG. 5, in step 510, controller 20 may receive, via GNSS receiver 30, position signals (i.e., satellite signals) indicative of a first position of vehicle 10 at the current time. In step 520, controller 20 may receive reference signals from IMU 50 during the movement of vehicle 10.

In step 530, controller 20 may integrate the reference signals over time to determine a second position of vehicle 10 at the current time. For example, controller 20 may calculate the velocity of vehicle 10 along three directions by integrating IMU signals indicative of the accelerations in the respective directions (i.e., a linear acceleration including components in the x-, y-, and z-directions respectively) of vehicle 10. Controller 20 may also determine the attitude or angular orientation (roll, heading, and pitch) of vehicle 10 by integrating IMU signals indicative of the angular rates (roll rate, yaw rate, and pitch rate) of vehicle 10. By utilizing the angular rates and the velocity, controller 20 may further estimate the second position of vehicle 10. In the disclosed embodiments, controller 20 may use any suitable dead-reckoning (i.e., calculating a current position by using a previously determined position) techniques, such as Kalman filter, to estimate the second position based on the IMU signals over time. Controller 20 may also calculate an uncertainty for the estimated second position. For example, the uncertainty may be set equal to the uncertainty from an error covariance matrix of the Kalman filter.

Because the IMU signals are not generated or echoed from an external source, the IMU signals are less likely to be spoofed. Accordingly, the IMU signals may serve as a reliable reference to verify the authenticity of the position signals. In step 540, controller 20 may determine whether the difference between the first and second positions is within the predetermined tolerance. If the difference is determined to be within the predetermined tolerance, controller 20 may accept the position signals as authentic and use the position signals to determine the actual position of vehicle 10. Controller 20 may then repeat step 510 to receive the position signals at the next point in time.

If the difference is determined to exceed or be equal to the predetermined tolerance, controller 20 may further determine whether IMU 50 was last calibrated within a predetermined amount of time before the current time (step 550). Generally, the small errors of each IMU signal may be accumulated during the integration of the IMU signals. To ensure the difference between the first and second positions is not mainly due to the uncertainty of the IMU signals, controller 20 may check the last calibration time of IMU 50. If the last calibration of IMU 50 did not occur within the predetermined amount of time, controller 20 may conclude that the second position is less accurate and thus only alert the operator that there may be a possible spoofing attack on the position signals (step 560). Controller 20 may keep using the position signals to determine the actual position of vehicle 10, until the operator instructs, via user interface 60 and/or mobile device 65, controller 20 to disregard the position signals. Conversely, if the last calibration of IMU 50 occurred within the predetermined amount of time, controller 20 may conclude that the second position is accurate and the large difference between the first and second positions is mostly due to the errors of the position signals. As such, controller 20 not only alerts the operator to the errors of the position signals (step 570), but also automatically disregards the position signals in determining the actual position of vehicle 10 (step 580).

In some embodiments, when it is determined that the last calibration of IMU 50 did not occur within the predetermined amount of time, controller 20 may also initiate an automated calibration of IMU 50 in real time. This way, the IMU signals generated after the real-time calibration can be considered reliable and used to determine the second position accurately.

Similar to IMU 50, the signals generated by odometer 55 do not come from or depend from an external source, and thus are less likely to be spoofed. As such, part or all of the reference signals used in method 500 may be collected from odometer 55, which is similar to the use of the IMU signals disclosed in method 500, and is thus not elaborated here.

Figure 6:
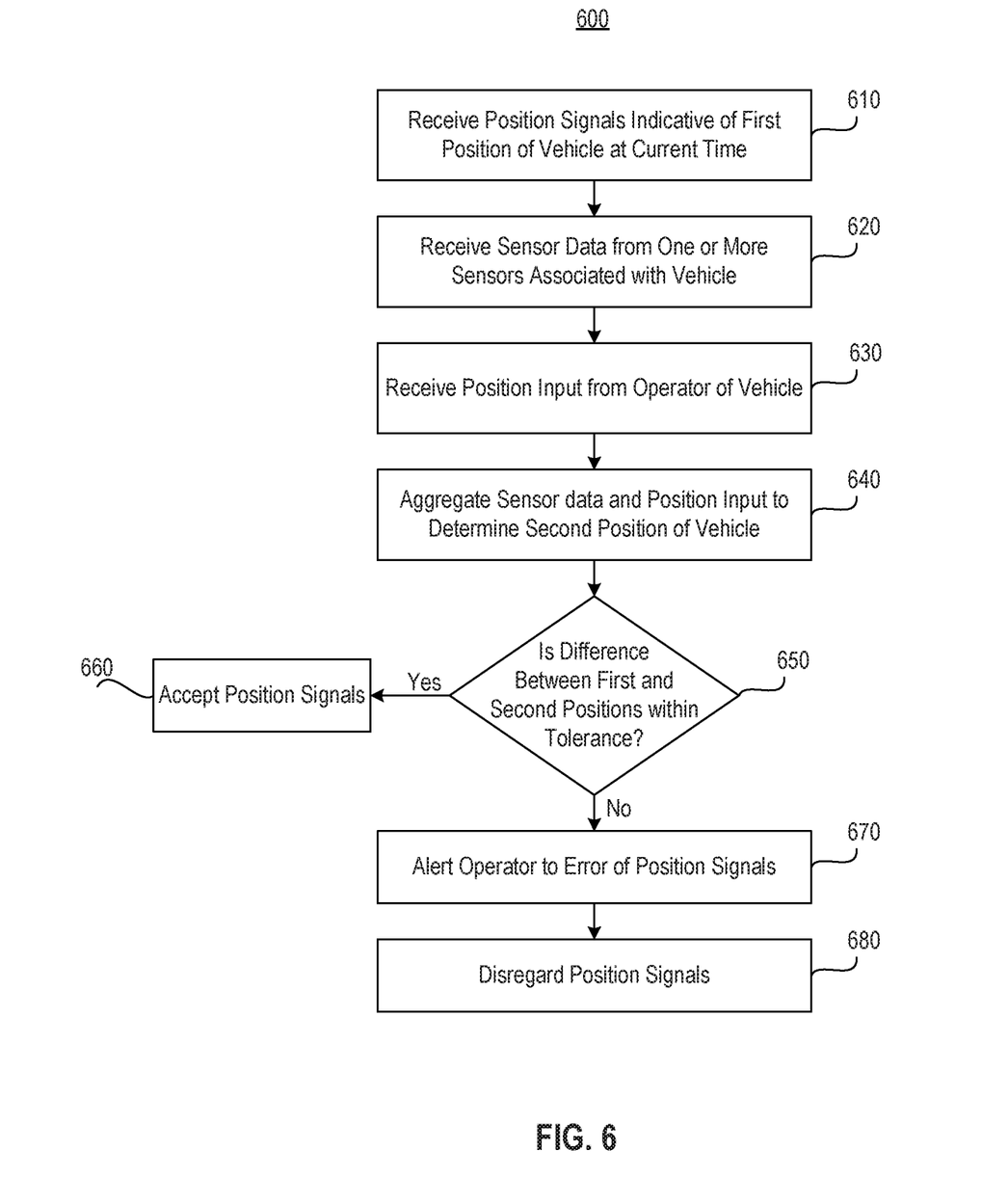
FIG. 6 is a flowchart of a fourth method for detecting signal spoofing, according to another exemplary embodiment.

FIG. 6 is a flowchart of a method 600 for detecting signal spoofing, according to another exemplary embodiment. Referring to FIG. 6, in step 610, controller 20 may receive, via GNSS receiver 30, position signals (i.e., satellite signals) indicative of a first position of vehicle 10 at the current time.

Next, controller 20 may receive the reference signals indicative of a second position of vehicle 10, from a plurality of different sources. In step 620, controller 20 may receive sensor data generated by one or more sensors associated with vehicle 10. In one example, camera 45 may capture an optical image of environment 46. Controller 20 may identify various features of environment 46 based on the different colors of the pixels in the camera image. LIDAR device 41 may also generate a 3D point cloud image representing a part of environment 46. Each data point in this 3D point cloud image may include a distance from LIDAR device 41 to a detected point of environment 46. Controller 20 may combine the corresponding images from camera 45 and LIDAR device 41 to generate a range map, which may be an image where a data point identifies a feature captured by the camera image and a range associated with that feature. The range map may represent a distance from camera 45 to that feature of environment 46. By constructing and analyzing the range map over time, controller 20 may estimate various rates of motion (e.g., linear velocities in the x-, y-, and z-axis directions, and angular velocities in the yaw, roll, and pitch directions) of vehicle 10 and further determine the position of vehicle 10. In another example, controller 20 may run a computer vision program to analyze the images taken by camera 45 and extract the features of environment 46, such as the shapes and dimensions of certain objects in environment 46.

In step 630, controller 20 may receive input from the operator or a passenger (i.e., occupant) of vehicle 10 regarding the current position of vehicle 10. For example, when the operator is present in vehicle 10, controller 20 may prompt the occupant to enter information regarding the position of vehicle 10. The information may include but are not limited to the street address, the name of a landmark seen by the occupant (e.g., Washington Monument), certain description regarding the landmark (e.g., a bridge, a railroad, an airport, etc.), and the like. Controller 20 may then translate the user inputted information into the corresponding longitude and altitude information. As another example, when the occupant is remotely monitoring and controlling vehicle 10, the occupant may view environment 46 through images taken by camera 45, and enter description regarding environment 46 (e.g., Golden Gate Bridge, Lincoln Memorial, etc.). In the disclosed embodiments, the occupant may input the position information via user interface 60 and mobile device 65.

In step 640, controller 20 may aggregate the sensor data and the position input by the occupant, and determine a second position of vehicle 10 based on the aggregated data. For example, controller 20 may compare the position of vehicle 10 determined from the range map with stored map information regarding the travelling route of vehicle 10. Based on the comparison, controller 20 may determine the identity of a landmark, e.g., Golden Gate Bridge, currently surrounding vehicle 10. Controller 20 may then examine whether the features extracted from camera images and/or the landmark information entered by the occupant match the characteristics of Golden Gate Bridge. If so, controller 20 may retrieve the position information of Golden Gate Bridge from the store map data and use the retrieved position information as the second position of vehicle 10. In this example, by combining the various sensor data and operator input, controller 20 may provide an accurate and robust determination of the second position. Moreover, with the mutual verification of the various sensor data and operator input, the determined second position may be trusted as the actual position of vehicle 10, and provide a reliable reference for detecting whether the position signals received in step 610 are spoofed.

In step 650, controller 20 may determine whether the difference between the first and second positions is within a predetermined tolerance. If the difference is within the predetermined tolerance, controller 20 may accept the position signals as authentic and use the position signals to determine the current actual position of vehicle 10 (step 660). If the difference exceeds or is equal to the predetermined tolerance, controller 20 may alert the operator of vehicle 10 to the errors of the position signals (step 670) and/or disregard the position signals in determining the actual position of vehicle 10 (step 680). In the disclosed embodiments, method 600 may be executed at a predetermined interval, such that the authenticity of the position signals may be periodically checked based on the input by the operator.

Figure 7:
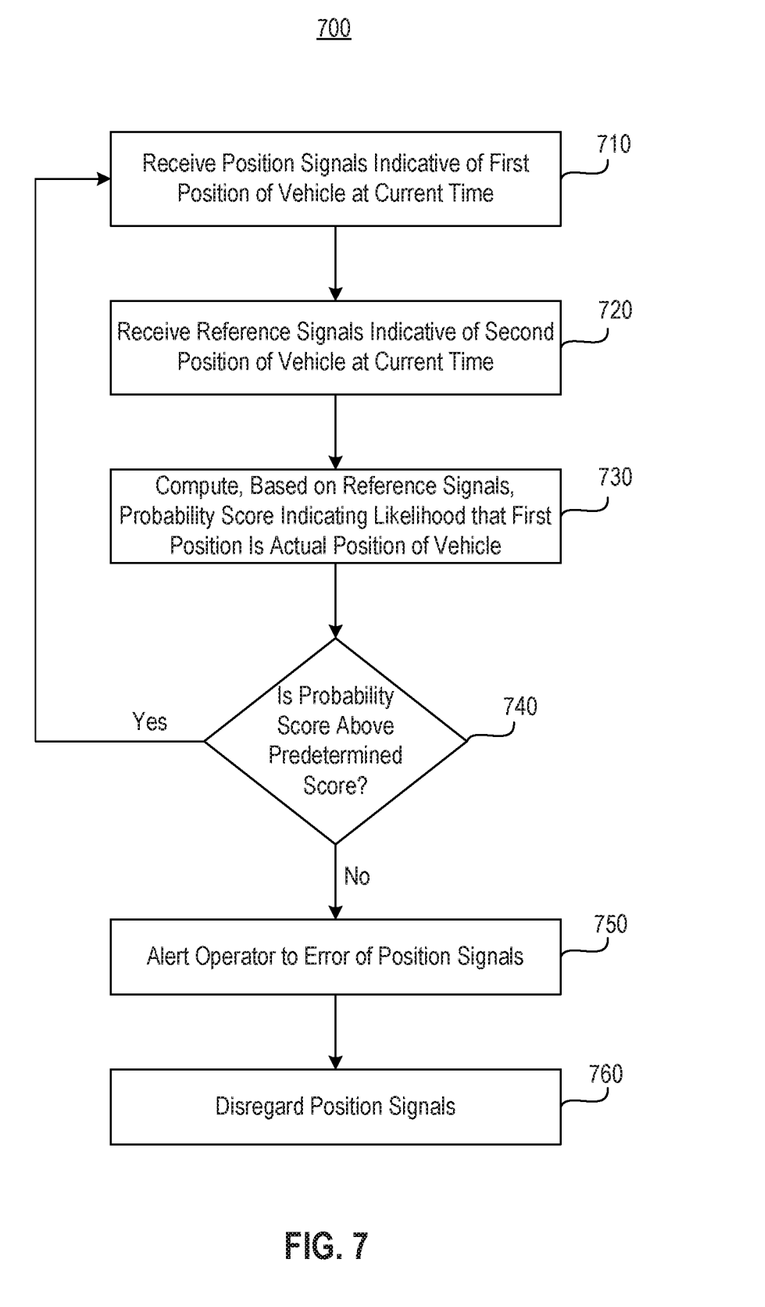
FIG. 7 is a flowchart of a fifth method for detecting signal spoofing, according to another exemplary embodiment.

FIG. 7 is a flowchart of a method 700 for detecting signal spoofing, according to another exemplary embodiment. Referring to FIG. 7, in step 710, controller 20 may receive, via GNSS receiver 30, position signals (i.e., satellite signals) indicative of a first position of vehicle 10 at the current time.

In step 720, controller 20 may receive reference signals indicative of a second position of vehicle 10 at the current time. Similar to steps 620 and 630 (FIG. 6), the references signals may be collected from a plurality of different sources, include sensors associated with vehicle 10 and/or input by the operator of vehicle 10. In some embodiments, controller 20 may determine a second position from each type of sensor data or operator input. As such, a plurality of second positions may be determined by controller 20.

In step 730, controller 20 may compute, based on the reference signals, a probability score indicating a likelihood that the first position is the actual position of vehicle 10. In one embodiment, controller 20 may compute the probability score based on the distribution of the first position and multiple second positions. For example, if the difference between the first position and each second position is larger than a predetermined tolerance while the differences among the second positions are all within the predetermined tolerance, controller 20 may compute a low probability score for the first position, indicating that the position signals are likely spoofed.

In another embodiment, controller 20 may assign a reliability score to each type of sensor data and/or user input. For example, if IMU 50 has not been calibrated for a certain amount of time, controller 20 may assign a low reliability score to IMU 50, indicating that the IMU data is less reliable. As another example, if odometer 55 has just been examined and calibrated by a certified vehicle technician, controller may assign a high reliability score to odometer 55. As yet another example, if vehicle 10 is travelling in a bright environment, such as directly toward the sunshine, controller 20 may also assign a low reliability score to camera 45 as the camera images may have a low contrast. Controller 20 may compute the probability score based on the difference between the first and second positions and the reliability score of the sensors. For example, if the difference is within the predetermined tolerance and the sensor based on which the second position is determined has a high reliability score, controller 20 may compute a high probability score. Conversely, if the sensor based on which the second position is determined has a low reliability score, controller 20 may still compute a low probability score despite the fact that the difference is within the predetermined tolerance.

In yet another embodiment, vehicle positioning system 200 may be tested with experimental spoofing attacks. From the testing data, a statistical model may be developed to provide prediction of signal spoofing (e.g., compute the probability score) based on factors such as the distribution profile of the first and second positions, reliabilities of the positioning sensors, whether the operator input is considered, etc. Moreover, during the subsequent daily usage of system 200, controller 20 may run a machine-learning algorithm to constantly refine or re-train the statistical models based on the operation data of vehicle 10 and/or operator feedback. For example, when the GPS data led vehicle 10 to a wrong destination while controller 20 did not detect any signal spoofing, controller 10 may analyze the GPS data received during the trip and refine the statistical model to improve the detection accuracy. Similarly, when the position input by the operator does not match the position indicated by the GPS data while controller 20 did not detect any signal spoofing, controller 10 may also run the machine-learning algorithm to debug the statistical model.

In step 740, controller 20 may determine whether the probability score is above a predetermined score. If the probability score is above the predetermined score, controller 20 may accept the position signals as authentic and use the position signals to determine the current actual position of vehicle 10. Controller 20 may then repeat step 710 to receive the position signals at the next point in time. If the probability score is below or equal to the predetermined score, controller 20 may alert the operator of vehicle 10 to the errors of the position signals (step 750) and/or disregard the position signals in determining the actual position of vehicle 10 (step 760).

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed spoofing detection system and related methods. Other embodiments will be apparent to those skilled in the art from consideration of the specification and practice of the disclosed spoofing detection system and related methods. It is intended that the specification and examples be considered as exemplary only, with a true scope being indicated by the following claims and their equivalents.

What is claimed is:

1. A spoofing detection method for a vehicle positioning system, comprising:
   receiving one or more position signals indicative of a first position of a vehicle at a first time;
   receiving sensor data from one or more image sensors associated with the vehicle;
   receiving position input from an operator of the vehicle;
   aggregating the sensor data and position input to determine a second position of the vehicle at the first time;
   determining a difference between the first position and the second position;
   determining that the difference is above a predetermined tolerance; and
   notifying the vehicle positioning system.

2. The spoofing detection method of claim 1, wherein the one or more position signals comprise a first plurality of signals from a first plurality of satellites.

3. The spoofing detection method of claim 1, wherein the one or more image sensors comprises at least one or a camera and a LIDAR device.

4. The spoofing detection method of claim 3, wherein sensor data comprising an optical image of environment.

5. The spoofing detection method of claim 1, further comprising:
   alerting an operator of the vehicle to a spoofing signal when the difference between the first and second positions is determined to be above the predetermined tolerance predetermined tolerance.

6. The spoofing detection method of claim 1, further comprising:
   disregarding the one or more position signals in determining an actual position of the vehicle when the difference between the first and second positions is determined to be above the predetermined tolerance.

7. The spoofing detection method of claim 1, wherein the one or more reference signals comprise a signal from a mobile device of a user in the vehicle.

8. The spoofing detection method of claim 1, wherein the position input received from the operator of the vehicle comprises a description of the environment.

9. The spoofing detection method of claim 1, wherein the one or more reference signals comprise a signal derived from one or more visual indicators of an actual position of the vehicle.

10. A spoofing detection method for a vehicle positioning system, comprising:
    receiving one or more position signals indicative of a first position of a vehicle at a first time;
    receiving sensor data from one or more image sensors associated with the vehicle;
    receiving position input from an operator of the vehicle;
    aggregating the sensor data and position input to determine a second position of the vehicle at the first time;

determining, based on the one or more reference signals, a probability score indicative of a likelihood that the first position is an actual position of the vehicle at the first time;

determining that the probability score is below a threshold score; and notifying the vehicle positioning system.

11. The spoofing detection method of claim 10, further comprising:

alerting an operator of the vehicle to a spoofing signal when the probability score is determined to be below the threshold score.

12. The spoofing detection method of claim 10, further comprising:

disregarding the one or more position signals in determining the actual position of the vehicle when the probability score is determined to be below the threshold score.

13. The spoofing detection method of claim 10, wherein the one or more position signals comprise a first plurality of signals from a first plurality of satellites.

14. The spoofing detection method of claim 13, wherein position input received from the operator of the vehicle comprises a description of the environment.

15. A vehicle positioning system, comprising:

a GPS configured to generate one or more position signals indicative of a first position of a vehicle at a first time, and one or more image sensors configured to generate sensor data; and a controller in communication with the plurality of sensors, the controller configured to:

receiving position input from an operator of the vehicle;

aggregating the sensor data and position input to determine a second position of the vehicle at the first time;

determine a difference between the first and second positions;

determine that the difference is above a predetermined tolerance; and generate an alert that the one or more position signals are spoofed.

16. The vehicle positioning system of claim 15, wherein the controller is further configured to:

disregard the one or more position signals in determining an actual position of the vehicle when the difference between the first and second positions is determined to be above the predetermined tolerance.

* * * * *